(12) United States Patent
Ito

(10) Patent No.: US 7,064,519 B2
(45) Date of Patent: Jun. 20, 2006

(54) BATTERY CHARGER WITH IMPROVED TERMINAL PROTECTION

(75) Inventor: Katsuyasu Ito, Okazaki (JP)

(73) Assignee: Makita Corporation, Anjo (JP)

(*) Notice: Subject to any disclaimer, the term of this patent is extended or adjusted under 35 U.S.C. 154(b) by 27 days.

(21) Appl. No.: 10/686,370

(22) Filed: Oct. 14, 2003

(65) Prior Publication Data

US 2004/0135542 A1    Jul. 15, 2004

(30) Foreign Application Priority Data

Oct. 21, 2002  (JP)  .............................. 2002-306123

(51) Int. Cl.
*H02J 7/00*    (2006.01)

(52) U.S. Cl. ...................... 320/112; 320/113
(58) Field of Classification Search ................ 320/107, 320/112–113; 429/97; 439/135, 136; 361/683
See application file for complete search history.

(56) References Cited

U.S. PATENT DOCUMENTS

| | | | | |
|---|---|---|---|---|
| 4,940,430 A | * | 7/1990 | Fujitani et al. | 439/686 |
| 5,107,075 A | * | 4/1992 | Currier, Jr. | 174/67 |
| 5,656,914 A | * | 8/1997 | Nagele et al. | 320/110 |
| 6,018,227 A | * | 1/2000 | Kumar et al. | 320/106 |
| 6,049,192 A | * | 4/2000 | Kfoury et al. | 320/113 |
| 6,346,793 B1 | | 2/2002 | Shibata et al. | |

FOREIGN PATENT DOCUMENTS

JP    07-065808 A    3/1995

\* cited by examiner

*Primary Examiner*—Edward Tso
*Assistant Examiner*—Robert Grant
(74) *Attorney, Agent, or Firm*—Lahive & Cockfield, LLP.; Anthony A. Laurentano, Esq.

(57) ABSTRACT

A charger (1) includes a connecting portion (5) provided in an upper case (3) of the charger. The connection portion (5) includes a pair of guide rails (6) to which a battery pack (40) is slidably attached. The charger further includes between the guide rails (6) a terminal block having various terminals (12–14) as well as a slide cover (21) linearly slidable in parallel with the direction in which the battery pack slides on the charger. Under normal operating conditions, the slide cover (21) is biased to a rear position in which the cover (21) is located over and protects a terminal block (11). When the battery pack (40) is set on the charger, the battery pack abuts and slides the slide cover to a forward position in which the terminal block (11) is exposed.

13 Claims, 9 Drawing Sheets

BATTERY CHARGER WITH IMPROVED TERMINAL PROTECTION

RELATED APPLICATION

This application claims priority on Japanese Patent Application No. 2002-306123 filed on Oct. 21, 2002.

BACKGROUND OF THE INVENTION

1. Field of the Invention

The present invention relates to chargers for use with battery packs which are used to run electric power tools. More particularly, the present invention relates to a battery pack charger with an improved mechanism for protecting its terminals.

2. Description of the Related Art

One type of known battery charger includes a connecting portion, such as a pair of guide rails protruding therefrom on which a battery pack is set for charging. A battery pack to be charged by such a charger typically includes a pair of slide rails provided on the surface of the battery pack that is set on the charger during a charge. The slide rails can be engaged with and slid along the guide rails of the charger in order to removably set the pack in place on the charger. When the battery pack is attached to the charger by sliding of the pack's slide rails along the charger's guide rails, electrical contact is established between the charge terminals and communication terminals provided on the connecting portion of the charger and the charge/discharge terminals and communication terminal of the battery pack.

While this type of battery charger achieves its intended objective, it is not free from certain problems and inconveniences, thus leaving room for improvement. For example, as the terminals of a charger of this type are exposed at the connecting portion to the external environment when the battery pack is not attached to the charger, the terminals may break or otherwise suffer damage that may result, for example, from the charger dropping to the floor or, conversely, by an object falling onto the charger. In view of such problems, Japan Published Unexamined Patent Application No. 2001-128372 proposes a charger that includes a terminal cover in a connecting portion where a battery pack is attached. According to the disclosure, the terminal cover is adapted to cover the charger terminals when the battery pack is not attached to the connecting portion and to be actuated by a motion of attaching the battery pack to the connecting portion to expose the charger terminals when the pack is attached to the connecting portion.

While this improved arrangement achieves its intended objective, it still suffers from certain deficiencies that reduce the utility of the device. For example, the terminal cover of the aforementioned disclosure is adapted to rotate between a protruding position, in which the cover protrudes from the housing and the connection portion so as to cover the charger terminals from the front of the charger, and a retracted position, in which the cover is retracted inside the housing in the direction of the slide of the battery pack so as to expose the charger terminals. This particular arrangement requires a through-hole in the charger housing so as to permit the protrusion and retraction of the terminal cover. Depending on the working environment, such as in outdoor environments, this arrangement is susceptible to ingression of rain, dust, and other foreign matter through the through-hole, thereby causing short-circuiting or other such failures.

Another disadvantage associated with the foregoing device is the need to allocate or reserve the space within the housing to allow the terminal cover to be retracted inside the charger. This results in otherwise unnecessary increases in the size of the entire device.

SUMMARY OF THE INVENTION

In view of the above-identified problems, an important object of the present invention is to provide a charger that protects the terminals from damage and ensures high waterproofing and dustproofing for the terminals while maintaining the relatively small size of the charger.

The above objects and other related objects are realized by the invention, which provides a charger comprising: a housing including on an outside surface thereof a connecting portion to which a battery pack is attached by a slide of the battery pack in a predetermined direction on the connecting portion; a plurality of terminals provided in the connecting portion for establishing electrical connection with the battery pack upon attachment of the battery pack to the connecting portion; urging means; and protective means provided on the connecting portion and capable of linear movement in the predetermined direction. In this charger, under normal operating conditions, the protective means is urged by the urging means to a covering position in which the protective means covers the terminals, and when the battery pack is attached to the connecting portion, the protective means is adapted so as to be abutted and moved by the battery pack to a withdrawn position in which the terminals are exposed.

According to the charger, when the battery pack is not set on the charger, the protective means is located over the terminals, ensuring protection of the terminals from objects falling onto the connecting portion or from damage to the terminals caused by the charger falling to the floor or the ground. Further, the protective means is brought into contact by the battery pack and linearly slid to a covering position by the forward slide of the pack during its attachment to the charger. The protective means prevents exposure of the through-holes when the charger is not used. This maintains the waterproofing and dustproofing of the charger, thus reducing the possibility of failure due to rainwater or other foreign matter and enhancing the reliability and durability of the charger. As a further advantage offered by the foregoing charger, the protective means can be slid over the connecting portion without being retracted inside the housing as required by a certain conventional arrangement. Since no additional space need be reserved or allocated within the housing to accommodate the protective means, the charger can be made more compact.

According to one aspect of the present invention, the charger further comprises a terminal block on which the terminals are erected and oriented in the predetermined direction. Moreover, the protective means may comprise a slide cover including a top plate and a pair of side plates that extend orthogonally downwards from side edges of the top plate and are oriented in the predetermined direction. The top plate is located directly over the terminals and the side plates flank the terminals when no battery pack is attached to the charger.

According to another aspect of the present invention, the urging means includes at least one coil spring interposed between the slide cover and a portion of the housing below the slide cover. The urging means urges the slide cover in the predetermined direction to the covering position.

According to still another aspect of the present invention, the charger further comprises means for limiting the movement of the slide cover. The means for limiting the movement includes a through-hole which is provided in the outside surface of the housing below the slide cover and elongated in the predetermined direction. The means for limiting the movement additionally includes a stopper protruding from an under surface of the top plate into the elongated through-hole, such that the movement of the slide cover with respect to the housing is limited to the movement of the stopper within the elongated through-hole.

According to yet another aspect of the present invention, the charger further comprises means for slidably attaching the stopper to the housing so as to allow the slide cover to slide with respect to the housing without being detached from the housing.

In another embodiment of the present invention, the means for slidably attaching the stopper includes a screw which is upwardly tightened into the stopper through the elongated through-hole and a washer penetrated by the screw on the elongated through-hole.

According to one feature of the present invention, the charger further comprises guide means provided in the connecting portion for facilitating a slide of the battery pack to bring the pack into attachment to the connecting portion.

According to another feature of the present invention, the guide means includes a pair of guide rails extending in parallel with the predetermined direction, and the guide rails are adapted to receive the battery pack therebetween during attachment of the battery pack to the charger.

According to still another feature of the present invention, the terminals are located between the guide rails.

The present invention is also directed to a charger comprising: a connecting portion on which a battery pack is slid into attachment to the charger; a plurality of terminals provided on the connecting portion for establishing electrical connection with the battery pack upon attachment of the battery pack to the connecting portion; and a slide cover slidably attached to the connecting portion. Furthermore, the slide cover is urged to a first position, in which the slide cover snugly covers the terminals. However, during the attachment of the battery pack to the connecting portion, the slide cover is abutted and linearly slid by the battery pack to a second position, in which the slide cover no longer covers the terminals.

Other general and more specific objects of the invention will in part be obvious and will in part be evident from the accompanying drawings and descriptions which follow.

BRIEF DESCRIPTION OF THE ATTACHED DRAWINGS

For a fuller understanding of the nature and objects of the present invention, reference should be made to the following detailed description and the accompanying drawings, in which.

DETAILED DESCRIPTION OF THE PREFERRED EMBODIMENT

A preferred embodiment of the present invention will be described hereinafter with reference to the attached drawings.

Figure 1:
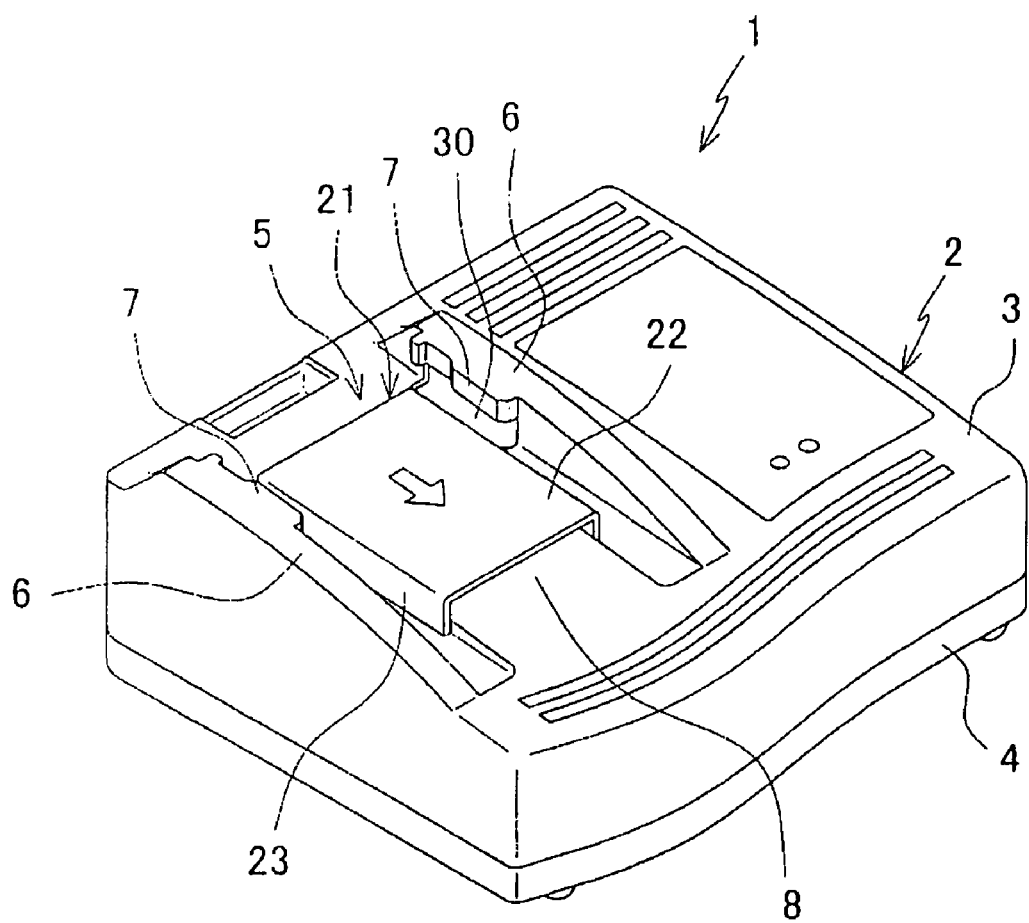
FIG. 1 is a perspective view of a battery charger according to the present invention.
Figure 2:
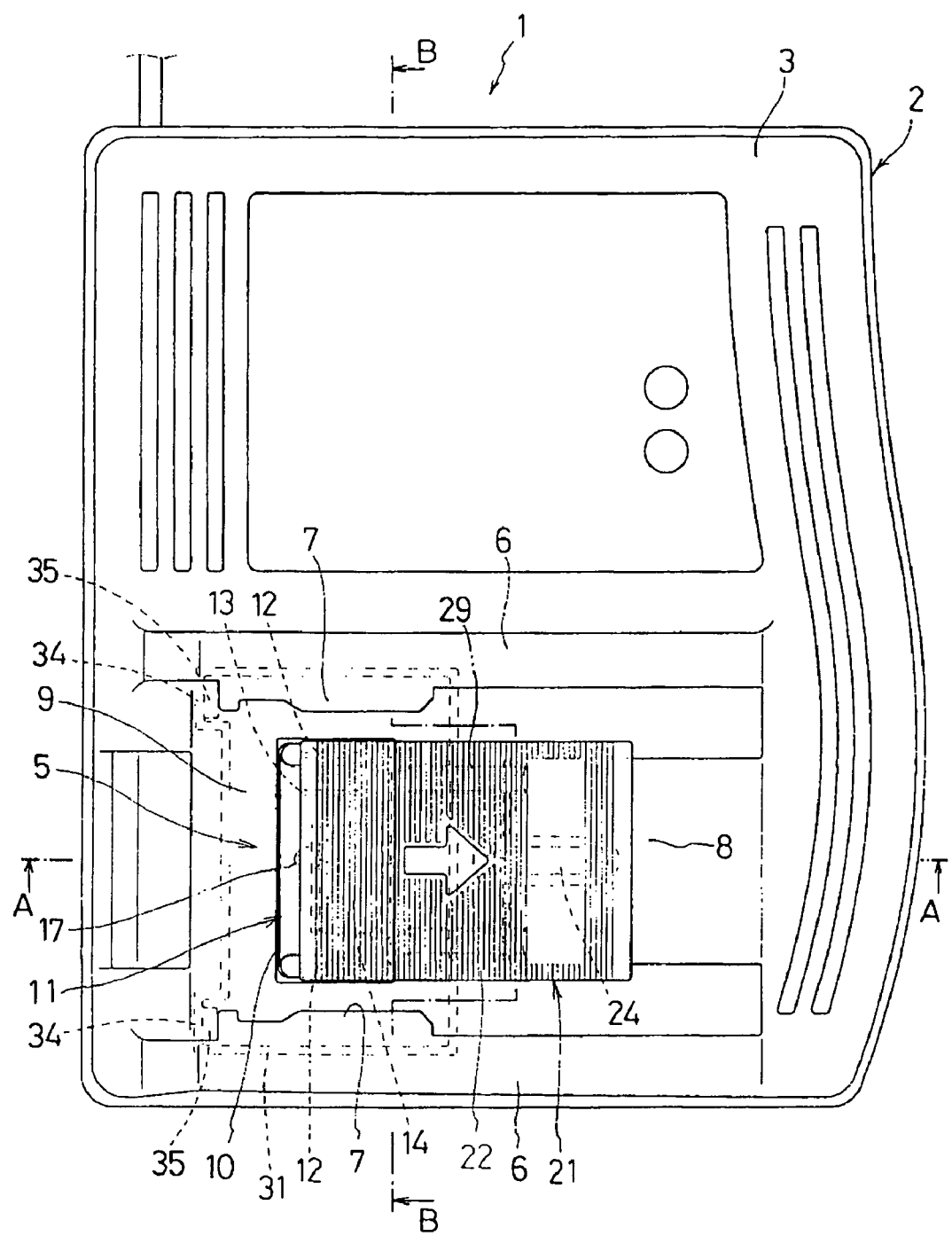
FIG. 2 is a plan view of the charger shown in FIG. 1.
Figure 3:
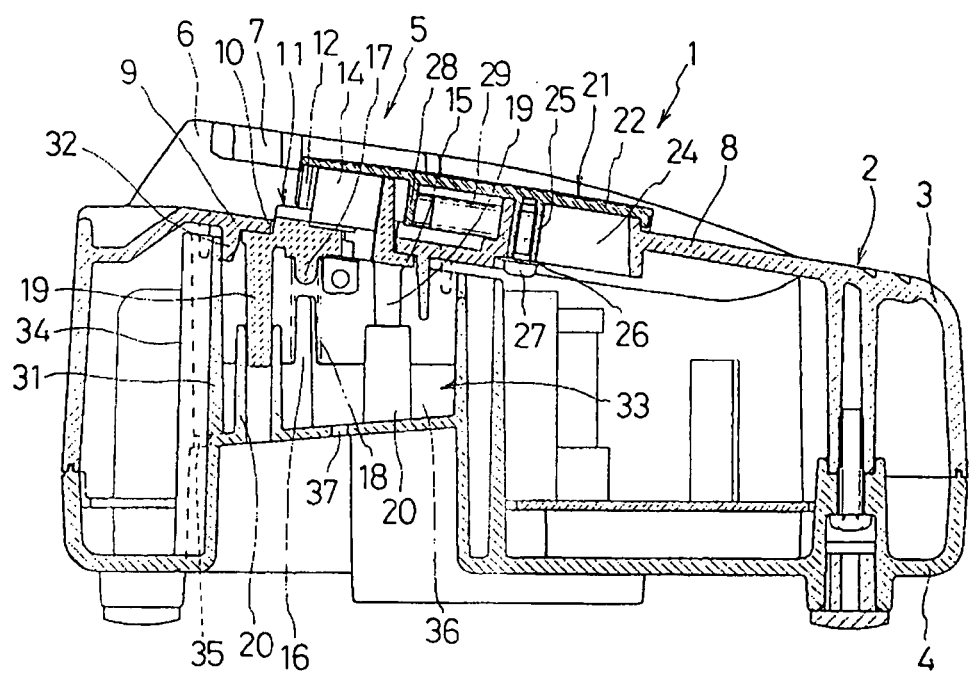
FIG. 3 is a cross-sectional view of the charger taken along line A—A of FIG. 2.
Figure 7:
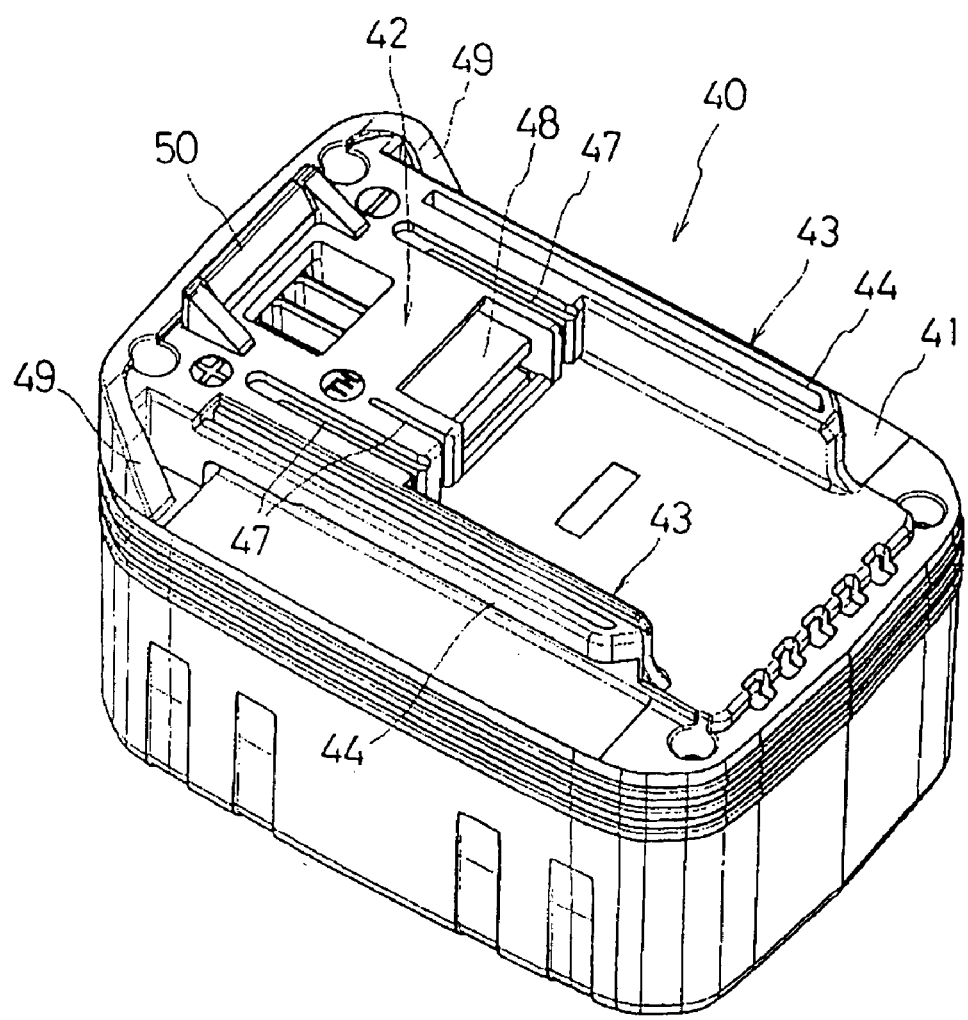
FIG. 7 is a perspective view of a battery pack that can be set on the charger of FIG. 1 for recharging.
Figure 8:
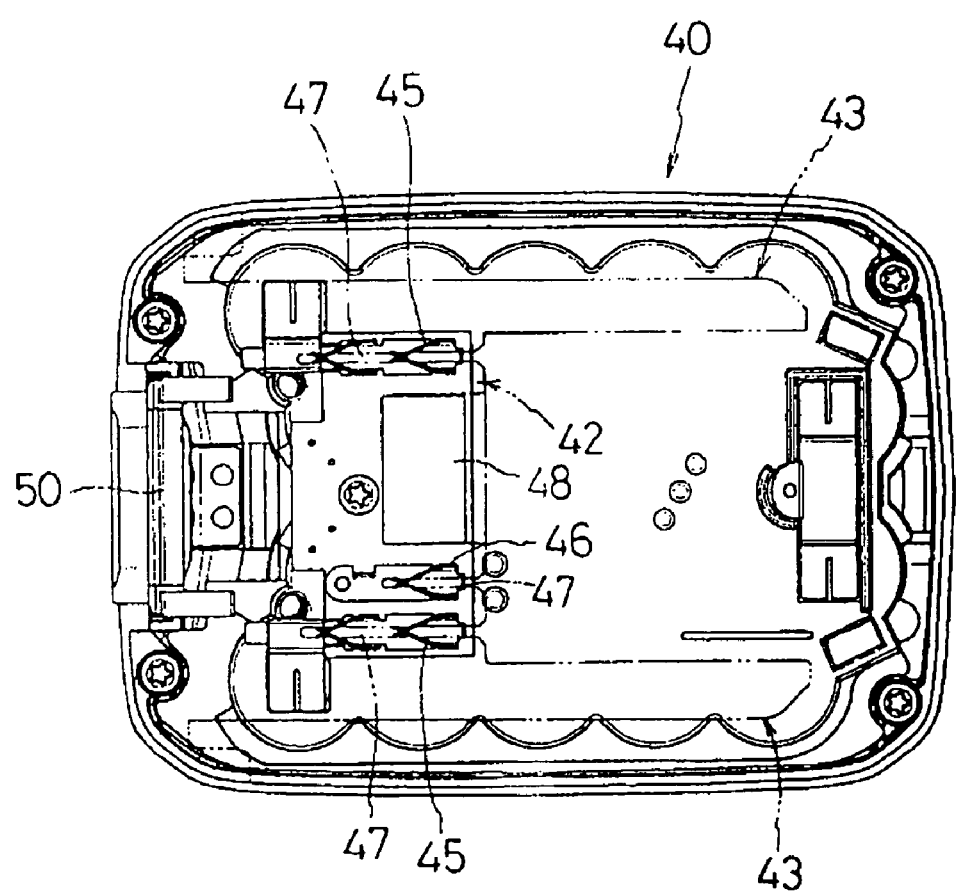
FIG. 8 is a plan view of the battery pack shown in FIG. 7.

FIG. 1 is a perspective view of a battery charger 1 in accordance with the present invention; FIG. 2 is a plan view of the charger 1; and FIG. 3 is a cross-sectional view of the charger 1 taken along line A—A of FIG. 2. The charger 1 includes an upper case 3 and a base plate 4 fitted together to form a box enclosure 2 encasing a circuit board for charging (not shown). A connecting portion 5 is provided on the enclosure's upper surface to which a battery pack 40 is attached as shown in FIGS. 7 and 8. The battery pack 40 includes an outer case 41 which contains a plurality of cells. Provided on the top surface of the outer case 41 are a connection block 42 and a pair of parallel slide rails 43 extending in a forward direction (in the direction opposite to the end of the pack's top surface where the connection block 42 is located) on both sides of the connection block 42. Each slide rail 43 includes an outwardly extending flange 44 along the entire length of the rail, thus forming an inverted L-shaped cross section on a plane which extends orthogonal to the aforementioned forward direction. Provided in the connection block 42 between the pair of parallel slide rails 43 are a pair of charge and discharge terminals 45, a temperature detection terminal 46, and three slits 47 that partially expose the terminals 45 and 46 for connection to the charger 1. The battery pack 40 further includes a communication connector terminal 48 and a pair of stoppers 49 formed on both sides of the connection block 42 at the rear of the battery pack 40.

Figure 4:
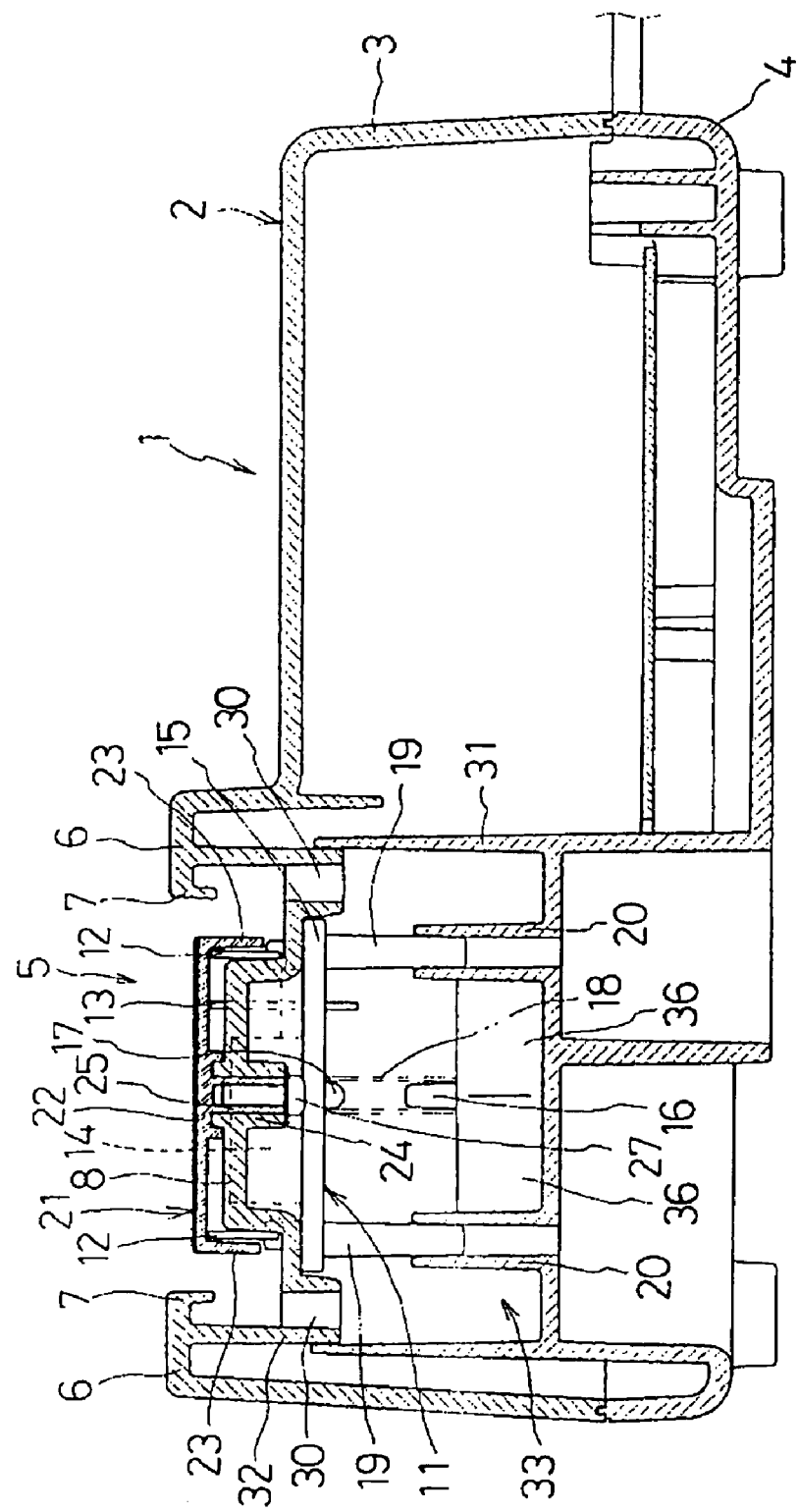
FIG. 4 is a cross-sectional view of the charger taken along line B—B of FIG. 2, with the front portion of the watertight partition omitted for clarity.
Figure 9:
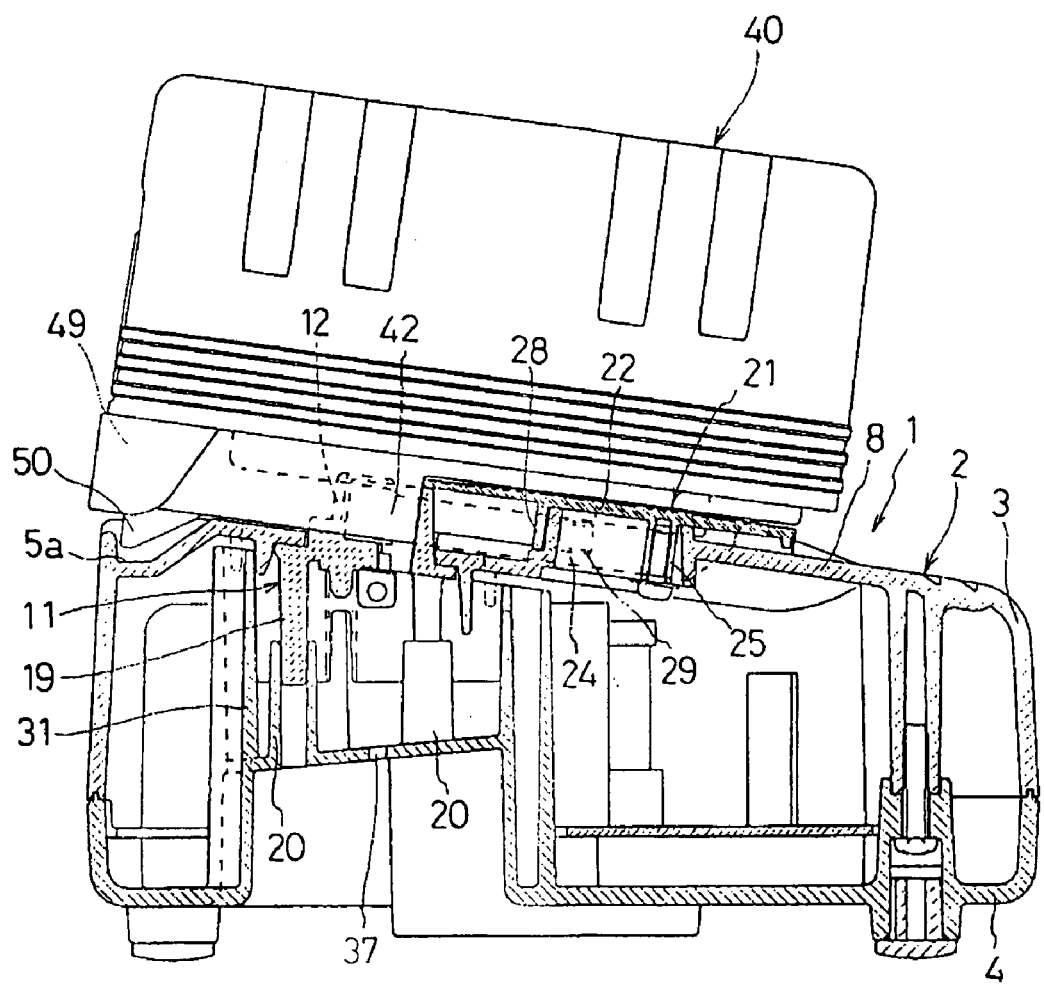
FIG. 9 is a side elevation showing the battery pack of FIG. 7 set in place on the charger for a charge.

Referring again to FIGS. 1 to 3, the connecting portion 5 of the charger 1 includes a pair of parallel guide rails 6 which are spaced apart by a distance greater than the distance between the outermost edges of the flanges 44 of the slide rails 43 of the battery pack 40. In addition, as also shown in FIG. 4, an extension 7 projects a short distance inward from the top surface of each guide rail 6. As shown in FIG. 9, to set the battery pack 40 on the charger 1, the slide rails 43 of the inverted pack 40 are first inserted between the guide rails 6 at the rear of the charger 1 (the left end of the charger as seen in FIGS. 2, 3, and 9 will be hereafter referred to as its rear), enabling the guide rails 6 to hold the slide rails 43 therebetween. The battery pack 40 is then moved forward with the slide rails 43 sliding along the guide rails 6 until the stoppers 49 of the battery pack 40 come into abutment with the rear ends of the guide rails 6. As best shown in FIGS. 3 and 9, the entire connecting portion 5 is sloped generally downward to the front end thereof so that the weight of the battery pack 40 facilitates the battery pack's sliding motion and stabilizes the battery pack 40 when the pack is set in place.

Referring again to FIGS. 2 and 3, the connecting portion 5 of the charger 1 includes a rear portion 9 and a front portion 8 which is generally located at a higher plane than the rear portion 9 so as to form a transverse step therebetween that spans the guide rails 6. Provided in the rear portion 9 is a rectangular hole 10 that is oriented orthogonally to the guide rails 6 and receives a terminal block 11. As also shown in FIG. 4, the terminal block 11 is a generally rectangular plate including a pair of charge terminals 12, a temperature detection terminal 13, and a communication connector terminal 14 that are erected on the top surface thereof and oriented along the shorter sides of the enclosure 3 (i.e., in the direction in which the guide rails 6 extend). Additionally, the terminal block 11 includes a retainer flange 15 provided along the bottom of the terminal block 11. The retainer flange 15 is sized larger than the rectangular hole 10 so as to prevent the terminal block 11 from slipping out of the hole 10. The terminal block 11 is upwardly urged by a coil spring 18 interposed between a boss 16 protruding from the top surface of the base plate 4 and a protrusion 17 on the under surface of the terminal block 11, abutting the retainer flange 15 against the under surface of the upper case 3 and bringing the terminals to their uppermost position. Furthermore, three guide posts 19 protrude downwards from the under surface of the terminal block 11, tapering to their top free ends. One of the guide posts 19 is located behind the protrusion 17, with the remaining two located forward of the protrusion 17, adjacent to the lateral side edges of the terminal block 11. Three guide tubes 20 protrude from the upper surface of the base plate 4 in the positions corresponding to the guide posts 19 so that the posts 19 may be aligned with and loosely inserted in the tubes 20, contributing to the proper positioning and stabilization of the terminal block 11 in its uppermost position.

Figure 5:
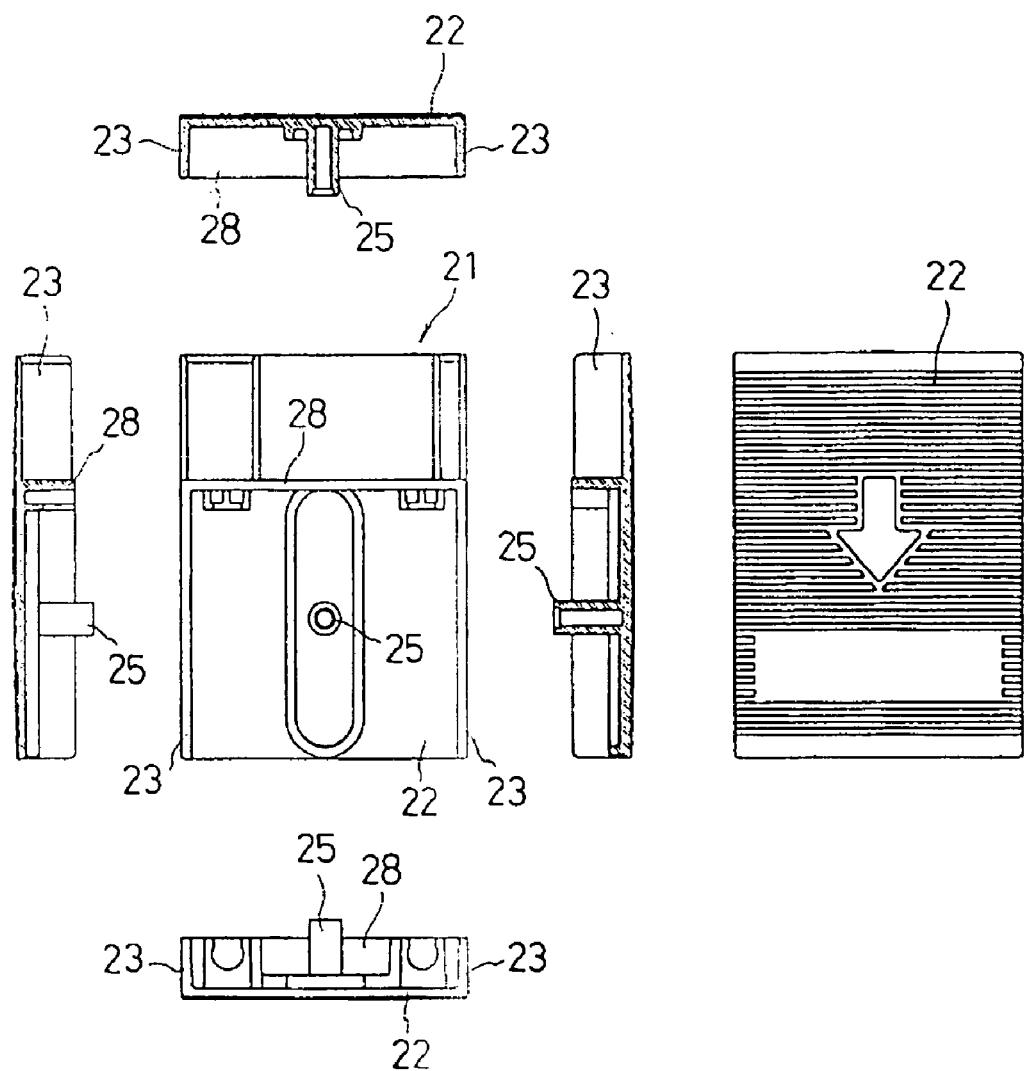
FIG. 5 shows the slide cover of the charger of FIG. 1 in six different views.

Referring to FIGS. 1–4, a slide cover 21 is mounted on the connecting portion 5 of the charger 1, extending in parallel to the guide rails 6 over the boundary between the front portion 8 and the rear portion 9. As also shown in FIG. 5, the slide cover 21 includes a flat top plate 22 that covers the rear portion 9 and a pair of side plates 23 that extend orthogonally downwards from the side edges of the top plate 22, thus forming an approximately U-shaped cross-section on a plane which extends orthogonal to the aforementioned forward direction. Due to this geometry, the slide cover 21 is slidable on the connecting portion 5 between the rear portion 8 and the rear portion 9. An elongated hole 24 is provided at the center of the charger's front portion 8, extending in parallel with the guide rails 6. A stopper 25 formed at the center of the under surface of the top plate 22 penetrates the elongated hole 24, and a screw 27 is tightened into the stopper 25 via a washer 26 (see FIG. 3) from the bottom of the upper case 3. This attaches the slide cover 21 to the upper case 3 in a manner that prevents the slide cover from slipping off the upper case while allowing the stopper 25 to slide on the connecting portion 5 in back-and-forth strokes within the limitations defined by the elongated hole 24.

Referring to FIGS. 2, 3, and 5 in particular, the slide cover 21 additionally includes a transverse partition 28 in the rear of the stopper 25 on the under surface of the top plate 22. The transverse partition 28 connects the side plates 23 and has approximately the same height as that of the side plates 23. An urging means, such as a pair of coil springs 29, is interposed between the transverse partition 28 and the rear end of the front portion 8. Accordingly, under the normal operating conditions, the slide cover 21 is urged by the biasing force of the coil springs 29 to its rearmost position (i.e., the covering position) as shown in FIG. 3, in which the stopper 5 is brought into abutment with the rear end of the elongated hole 24. In this position, the top plate 22 protrudes upward of the rear portion 9 and covers the terminals 12–14 from above, while the side plates 23 are located along the outward sides of the respective charge terminals 12 thus flanking the terminals 12.

Figure 6:
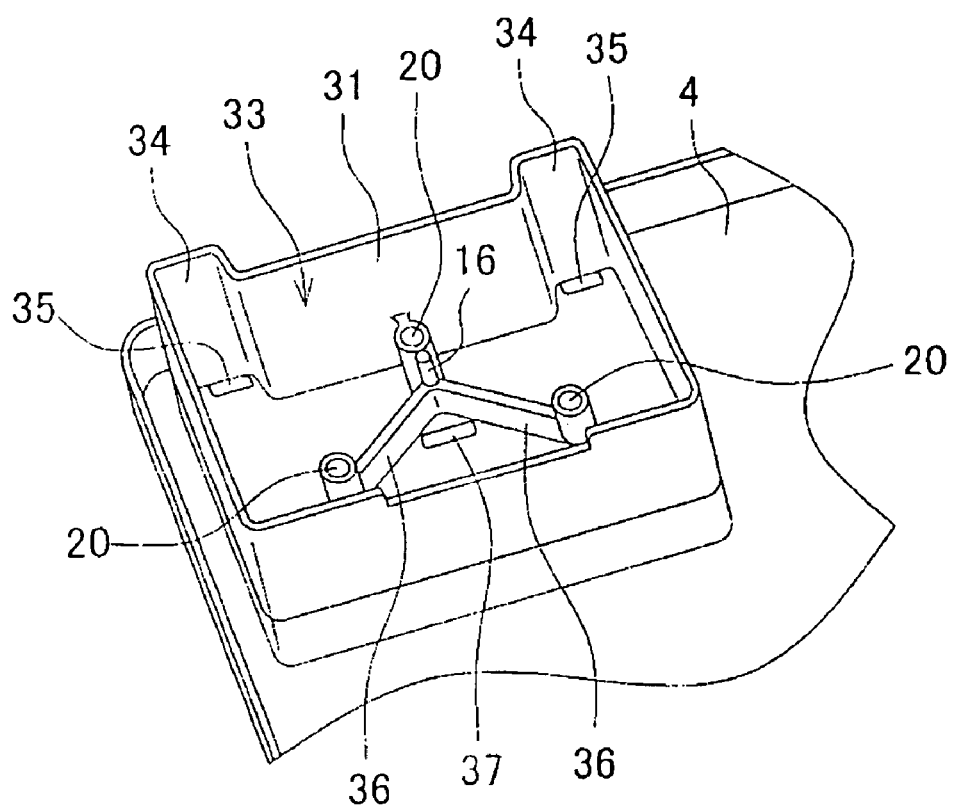
FIG. 6 is a perspective view of the watertight partition provided on the base plate of the charger of FIG. 1.

Referring to FIG. 4, the molding of the protrusions 7 of the guide rails 6 necessitates provision of a core hole 30 directly below each protrusion 17 in the upper case 3. As also shown in FIG. 6, a watertight partition 31 is erected from the upper surface of the base plate 4, surrounding the core holes 30 as well as the terminal block 11. Additionally, an abutment wall 32 protrudes downward from the under surface of the upper case 3, also surrounding the protrusions 7 and the terminal block 11 in a configuration generally matching the watertight partition 31. The watertight partition 31 is fitted on the entire outer peripheral surface of the abutment wall 32, thus defining a cavity 33 directly below the terminal block 11 and the core holes 30 and sealing off the periphery of the cavity 33. In addition, the bottom surface of the base plate 4 is sloped downward to the rear end thereof. The rear right and left corners of the watertight partition 31 jut out to define a pair of protrusions 34 extending from the rear corners of the continuously sloped bottom surface of the base plate 4, such that the portions of the bottom surface within the protrusion 34 are located at the lowest level in the bottom surface. A drain hole 35 is provided at the base of each protruding portion 34. Furthermore, a pair of guide walls 36 connects the boss 16 to the right and left guide tubes 20. A third drain hole 37 is provided in the bottom surface of the base plate 4 adjacent to the apex of the guide walls 36, where the guide walls are connected at the boss 16. Accordingly, even if rainwater or other fluid enters the cavity 33 through either or both core holes 30 of the upper case 3, the inclination of the bottom surface of the base plate 4 causes such fluid to flow to the drain holes 36 and 37 and exit the base plate 4. This protects the circuitry located outside of the cavity 33 within the enclosure 2 from short-circuiting.

To charge the battery pack 40 with a charger 1 thus constructed, the battery pack 40 is first inverted with the connection block 42 facing downward. The slide rails 43 of the battery pack 40 are then placed between the guide rails 6 of the charger's connecting portion 5. When the battery pack 40 is slid forward, the pack's connection block 42 abuts against and pushes forward the slide cover 21 of the charger 1 against the biasing force of the coil springs 29. In this way, the slide cover 21 is withdrawn without obstructing the forward slide of the battery pack 40. As shown in FIG. 9, when the battery pack 40 is slid into place with its stoppers 49 abutting the rear ends of the guide rails 6 of the charger 1, the slide cover 21 is located in its withdrawn position. As illustrated, in this position, the terminal block 11 is exposed and the charge terminals 12, the temperature detection terminal 13, and the communication connector terminal 14 of the charger 1 are electrically connected with the charge and discharge terminals 45, the temperature detection terminal 46, and the communication connector terminal 48, respectively, of the battery pack 40. Furthermore, as best shown in FIG. 7, a click plate 50 is mounted at the rear of the battery pack 40 so as to be urged to the illustrated protruding position by a biasing means (not shown). Referring again to FIG. 9, when the battery pack 40 is set in place on the charger 1, the click plate 50 fits into a recess 5a at the rear edge of the connecting portion 5 with a sensible click.

When the battery pack 40 is removed from the connecting portion 5 of the charger 1, for example, upon completion of a charge, the battery pack 40 is slid rearward from the attachment position of FIG. 9, allowing the biasing force of the coil springs 29 to slide the slide cover 21 in the rearward direction. The slide cover 21 continues to move rearward with the slide of the battery pack 40, until it returns to the covering position (shown in FIGS. 1–3) over the terminal block 11 when the battery pack 40 is removed.

According to the foregoing embodiment, when the battery pack 40 is not set on the charger 1, the terminal cover 14 is located over the terminal block 11, ensuring protection of the terminals of the terminal block 11 from objects falling onto the connecting portion 5 or from damage to the block 11 caused by the charger 1 falling to the floor or the ground. Further, as described above, the terminal cover 14 is abutted, and linearly slid to a covering position by the forward slide of the battery pack 40 during its attachment to the charger 1. As it automatically returns to the covering position upon removal of the battery pack from the charger 1, the slide cover 21 prevents exposure of the through-holes when the charger is not used. This maintains the waterproofing and dustproofing characteristics of the charger 1, thus reducing the possibility of failure due to rainwater or other foreign matter and enhancing the reliability and durability of the charger 1. As a further advantage offered by the foregoing embodiment, the slide cover 21 can be slid on the connecting portion 5 without being retracted inside the box enclosure 2 as required by a certain conventional arrangement. Since no additional space need be reserved or allocated within the enclosure 2 for receiving or accommodating the cover 21, the charger 1 can be made more compact.

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. For example, the cross-sectional shape of the slide cover 21 is not limited to a U-shape as described in the foregoing embodiment, the slide cover may be redesigned to have any other shape to suit particular applications, as long as such a cover can cover the terminals of the charger 1. That includes, but is not limited to, a semicircular, curved, or simple flat shape. In addition, depending on the arrangement of the charger terminals, it is possible to provide a plurality of slide covers instead of a single cover as in the foregoing embodiment. Accordingly, the scope or spirit of the present invention is limited only by the terms of the appended claims.

Having described the invention, what is claimed as new and desired to be secured by Letters Patent is:

1. A charger comprising:
    a housing including on an outside surface thereof a connecting portion to which a battery pack is attached by a slide of the battery pack in a predetermined direction on the connecting portion;
    a plurality of terminals provided in the connecting portion for establishing electrical connection with the battery pack upon attachment of the battery pack to the connecting portion;
    urging means;
    protective means provided on the connecting portion and capable of linear movement in the predetermined direction wherein under normal operating conditions, the protective means is urged by the urging means to a covering position in which the protective means covers the terminals, and when the battery pack is attached to the connecting portion, the protective means is adapted so as to be abutted and moved by the battery pack to a withdrawn position in which the terminals are exposed;
    a terminal block on which the terminals are erected and oriented in the predetermined direction, wherein the protective means is a slide cover including a top plate and a pair of side plates that extend orthogonally downwards from side edges of the top plate and are oriented in the predetermined direction, the top plate being located directly over the terminals and the side plates flanking the terminals when no battery pack is attached to the charger; and
    means for limiting the movement of the slide cover, the means for limiting the movement including a through-hole which is provided in the outside surface of the housing below the slide cover and elongated in the predetermined direction, the means for limiting the movement further including a stopper protruding from an under surface of the top plate into the elongated through-hole, such that the movement of the slide cover with respect to the housing is limited to the movement of the stopper within the elongated through-hole.

2. A charger in accordance with claim 1, wherein the urging means includes at least one coil spring interposed between the slide cover and a portion of the housing below the slide cover for urging the slide cover in the predetermined direction to the covering position.

3. A charger in accordance with claim 1 further comprising means for slidably attaching the stopper to the housing so as to allow the slide cover to slide with respect to the housing without being detached from the housing.

4. A charger in accordance with claim 3, wherein the means for slidably attaching the stopper includes a screw which is upwardly tightened into the stopper through the elongated through-hole and a washer penetrated by the screw on the elongated through-hole.

5. A charger in accordance with claim 1 further comprising guide means provided in the connecting portion for facilitating a slide of the battery pack to bring the pack into attachment to the connecting portion.

6. A charger in accordance with claim 5, wherein the guide means includes a pair of guide rails extending in parallel with the predetermined direction, wherein the guide rails are adapted to receive the battery pack therebetween during attachment of the battery pack to the charger.

7. A charger in accordance with claim 6, wherein the terminals are located between the guide rails.

8. A charger comprising:
    a housing including on an outside surface thereof a connecting portion to which a battery pack is attached by a slide of the battery pack in a predetermined direction on the connecting portion;
    a plurality of terminals provided in the connecting portion for establishing electrical connection with the battery pack upon attachment of the battery pack to the connecting portion;
    urging means;
    protective means provided on the connecting portion and capable of linear movement in the predetermined direction wherein under normal operating conditions, the protective means is urged by the urging means to a covering position in which the protective means covers the terminals, and when the battery pack is attached to the connecting portion, the protective means is adapted so as to be abutted and moved by the battery pack to a withdrawn position in which the terminals are exposed;
    means for limiting the movement of the protective means, the means for limiting the movement including a trough-hole which is provided in the outside surface of the housing below the protective means and elongated in the predetermined direction, the means for limiting the movement further including a stopper protruding from an under surface of the protective means into the elongated through-hole, such that the movement of the protective means with respect to the housing is limited to the movement of the stopper within the elongated through-hole.

9. A charger in accordance with claim 8 further comprising means for slidably attaching the stopper to the housing so as to allow the protective means to slide with respect to the housing without being detached from the housing.

10. A charger in accordance with claim 9, wherein the means for slidably attaching includes a screw which is upwardly tightened into the stopper through the elongated through-hole and a washer penetrated by the screw on the elongated through-hole.

11. A charger in accordance with claim 8 further comprising guide means provided in the connecting portion for facilitating a slide of the battery pack to bring the pack Into attachment to the connecting portion.

12. A charger in accordance with claim 11, wherein the guide means includes a pair of guide rails extending in parallel with the predetermined direction, wherein the guide rails are adapted to receive the battery pack therebetween during attachment of the battery pack to the charger.

13. A charger in accordance with claim 12, wherein the terminals are located between the guide rails.

* * * * *